(12) United States Patent
Gomez

(10) Patent No.: US 12,121,934 B2
(45) Date of Patent: Oct. 22, 2024

(54) APPARATUS WITH DRUM FOR SEPARATING PACKAGINGS AND MATERIAL ADHERING THERETO, WITH IMPROVED ENVIRONMENTAL IMPACT

(71) Applicant: GREEN CREATIVE, Sucy en Brie (FR)

(72) Inventor: Rémi Gomez, Paris (FR)

(73) Assignee: GREEN CREATIVE, Sucy en Brie (FR)

( * ) Notice: Subject to any disclaimer, the term of this patent is extended or adjusted under 35 U.S.C. 154(b) by 30 days.

(21) Appl. No.: 18/027,472

(22) PCT Filed: Sep. 21, 2021

(86) PCT No.: PCT/EP2021/075948
§ 371 (c)(1),
(2) Date: Jun. 5, 2023

(87) PCT Pub. No.: WO2022/058616
PCT Pub. Date: Mar. 24, 2022

(65) Prior Publication Data
US 2023/0364646 A1    Nov. 16, 2023

(30) Foreign Application Priority Data
Sep. 21, 2020  (FR) ...................... 2009567

(51) Int. Cl.
*B07B 1/24*  (2006.01)

(52) U.S. Cl.
CPC ............ *B07B 1/24* (2013.01); *B07B 2230/01* (2013.01)

(58) Field of Classification Search
CPC ......... B07B 1/24; B07B 2230/01; B07B 1/52; B07B 13/16; B07B 1/22; B07B 1/524; B07B 13/003; B07B 13/075; B07B 1/18; B07B 4/06; B07B 7/00; B07B 7/083; Y02W 30/62; B02C 17/02; B65B 55/24
USPC ......................... 209/270, 689; 241/166, 167
See application file for complete search history.

(56) References Cited

U.S. PATENT DOCUMENTS

| | | | |
|---|---|---|---|
| 6,244,445 B1 * | 6/2001 | Yokoyama | B07B 1/24 209/687 |
| 2007/0119755 A1 * | 5/2007 | Freeman | B03C 7/06 209/12.2 |
| 2017/0266696 A1 * | 9/2017 | Gomez | B65B 55/24 |

FOREIGN PATENT DOCUMENTS

| | | | | |
|---|---|---|---|---|
| CN | 111589686 A | * | 8/2020 | |
| DE | 20214115 U1 | * | 3/2004 | ............ B07B 1/005 |
| FR | 3070882 | | 3/2019 | |
| FR | 3070882 A1 | * | 3/2019 | ........... B02C 17/007 |

(Continued)

*Primary Examiner* — Gene O Crawford
*Assistant Examiner* — Muhammad Awais
(74) *Attorney, Agent, or Firm* — MUNCY, GEISSLER, OLDS & LOWE, P.C.

(57) ABSTRACT

Processor apparatus for collecting material adhering to surfaces of packages for processing as waste, the processor apparatus including a cylindrical drum that is rotatable about a longitudinal first axis and that is provided with orifices for forming a screen that retains the packages and that allows the material for collecting to pass through; a motor for driving the cylindrical drum in rotation; and a first brush for brushing an inside surface of the cylindrical drum. The apparatus includes a blower device inside the drum for blowing a gas stream in a direction having a component parallel to the longitudinal first axis.

13 Claims, 3 Drawing Sheets

(56) References Cited

FOREIGN PATENT DOCUMENTS

| WO | WO-2007042926 A1 | * | 4/2007 | ............. | B02C 17/00 |
| WO | WO-2014076285 A1 | * | 5/2014 | ............... | B07B 1/24 |

* cited by examiner

APPARATUS WITH DRUM FOR SEPARATING PACKAGINGS AND MATERIAL ADHERING THERETO, WITH IMPROVED ENVIRONMENTAL IMPACT

The invention relates to sorting waste, in particular for the purposes of recycling or disposal. The invention relates more particularly to a device for cleaning packages in the context of reprocessing waste, in particular waste from supermarkets.

BACKGROUND OF THE INVENTION

In the field of processing waste coming in particular from supermarkets, processor apparatus is known for collecting the material adhering to the surfaces of packages for processing. Such apparatus includes a cylindrical drum that is rotatable about a longitudinal axis and that is provided with orifices forming a screen for retaining the packages while allowing the material for collection to pass through. Motor means drive the cylindrical drum in rotation and an external casing connects the material that has come from the packages inserted into the cylindrical drum and that has passed through the wall of the cylindrical drum. The length of the drum is generally designed so that a package that is inserted through an inlet first end of the drum leaves through the second end of the drum after being cleaned completely, i.e. after being subjected to a number of cleaning cycles (number of rotations within the drum) sufficient for ridding it of its soiling. Thus, all the packages, however soiled they may be, are subjected to the same number of cleaning cycles. That reduces the processing capacity of the processor apparatus (in terms of volume of packages processed per hour), which represents an increased cost in energy consumed for a given volume of packages. Finally, cleaning operations on a long drum consume a great deal of water.

Proposals have also been made to install a rotary brush, which is likewise driven in rotation, inside the cylindrical drum in order to brush the packages and the inside surface of the drum in order to reduce the time required for processing the packages.

Nevertheless, such a solution does not make it possible to achieve sufficient improvement in the energy consumption and in the ecological footprint of the processor apparatus (taking account of its consumption of energy and of natural resources, in particular water).

OBJECT OF THE INVENTION

A particular object of the invention is to improve the ecological footprint of processor apparatus for collecting material adhering to the surfaces of packages.

SUMMARY OF THE INVENTION

To this end, there is provided processor apparatus for collecting material adhering to surfaces of packages for processing as waste, the processor apparatus comprising a cylindrical drum that is rotatable about a longitudinal first axis and that is provided with orifices for forming a screen that retains the packages and that allows the material for collecting to pass through. The processor apparatus includes a motor for driving the cylindrical drum in rotation and a first brush for brushing an inside surface of the cylindrical drum. According invention, the apparatus includes a blower device inside the drum for blowing a gas stream in a direction having a component parallel to the longitudinal first axis.

The blower device enables lightweight packages, i.e. packages that can be assumed to be clean, to be expelled more quickly from the cycle of brushing/centrifuging the packages, thereby improving the cycle times of the machine. Processing apparatus for collecting material adhering to the surfaces of packages is thus obtained that quickly expels packages that are clean without them being subjected to pointless additional brushing/centrifuging cycles. Thus, the time and the quantity of energy devoted to cleaning a given volume of packages for processing is reduced.

The time required for processing waste is reduced when the apparatus includes a first rolling roller for rolling the packages or indeed a second rolling roller and/or a second brush.

A uniform and substantial blowing zone is obtained when the blower device has six blower nozzles.

The effect of blowing interacts synergistically with the effect of the first brush when the blower device is arranged to blow the gas stream into the first or the second quadrant of the drum.

Waste processing time is further reduced when the apparatus includes an injector device for injecting a liquid jet.

Advantageously, the injector device is arranged to inject the liquid jet at least onto the second brush.

Machine cycle time (including maintenance time) is further reduced when the first rolling roller is mounted to be movable relative to the frame in order to adopt a working first position in which the first rolling roller is not in contact with the second brush and a maintenance second position in which the first rolling roller comes into contact with the second brush. This improvement is even more significant when the second rolling roller is mounted to be movable relative to the frame in order to adopt a working first position in which the second rolling roller is not in contact with the second brush and a maintenance second position in which the second rolling roller comes into contact with the second brush.

Advantageously, the second brush extends substantially along the longitudinal first axis.

Towards the end of the process, waste is entrained even better without tilting the drum or having recourse to mechanical means for extracting processed waste from the drum when the first branch has a proximal first end and a distal second end, and the first brush extends in a first direction that forms a nonzero angle with a plane containing the longitudinal first axis and the distal second end or the proximal second end.

Cycle times are further improved when the first brush is arranged to direct the packages towards the first rolling roller.

Other characteristics and advantages of the invention appear on reading the following description of a particular and nonlimiting embodiment/implementation of the invention.

BRIEF DESCRIPTION OF THE DRAWINGS

Reference is made to the accompanying drawings, in which.

DETAILED DESCRIPTION OF THE INVENTION

Figure 1:
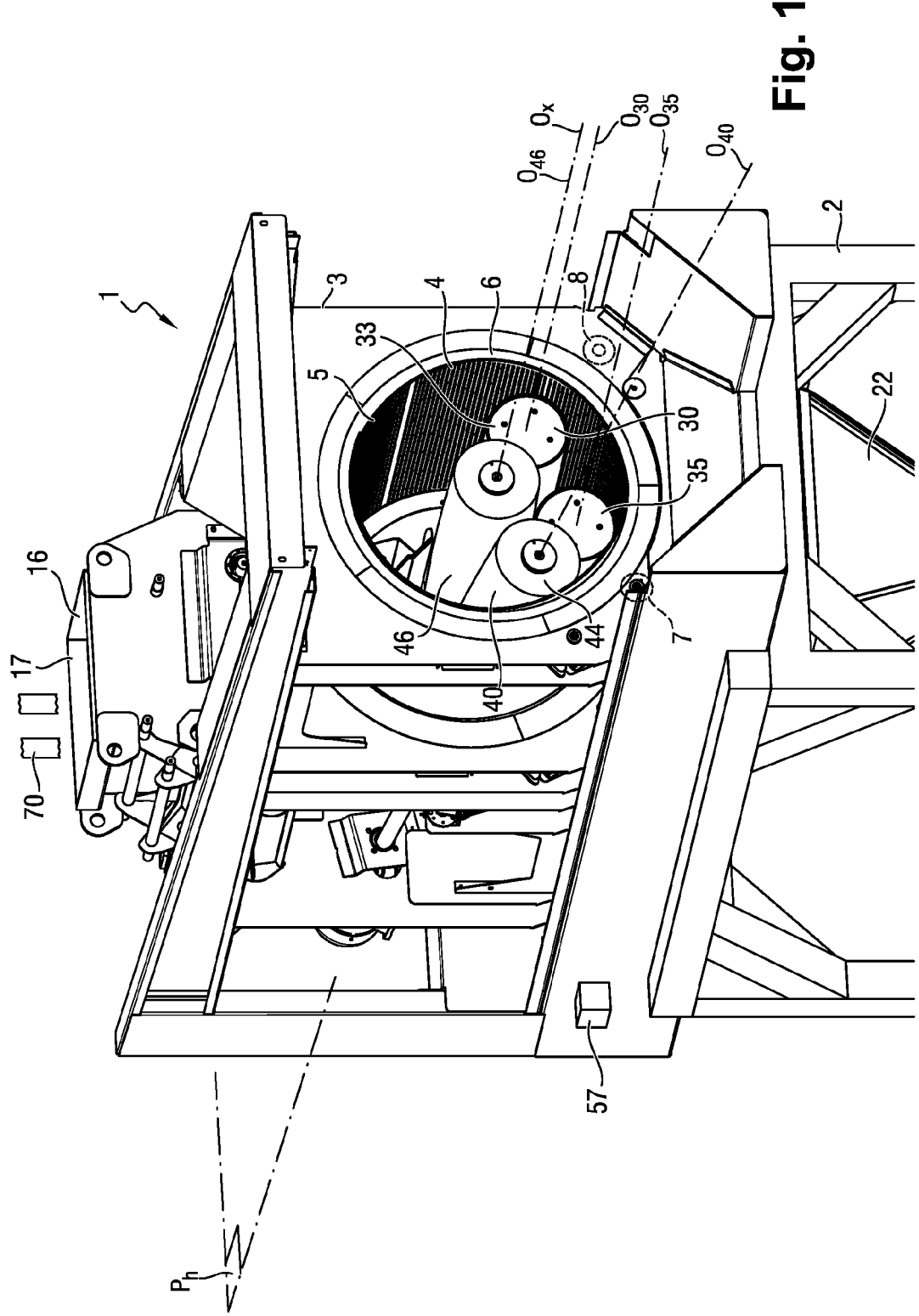
FIG. 1 is a first perspective view of processor apparatus of the invention.
Figure 2:
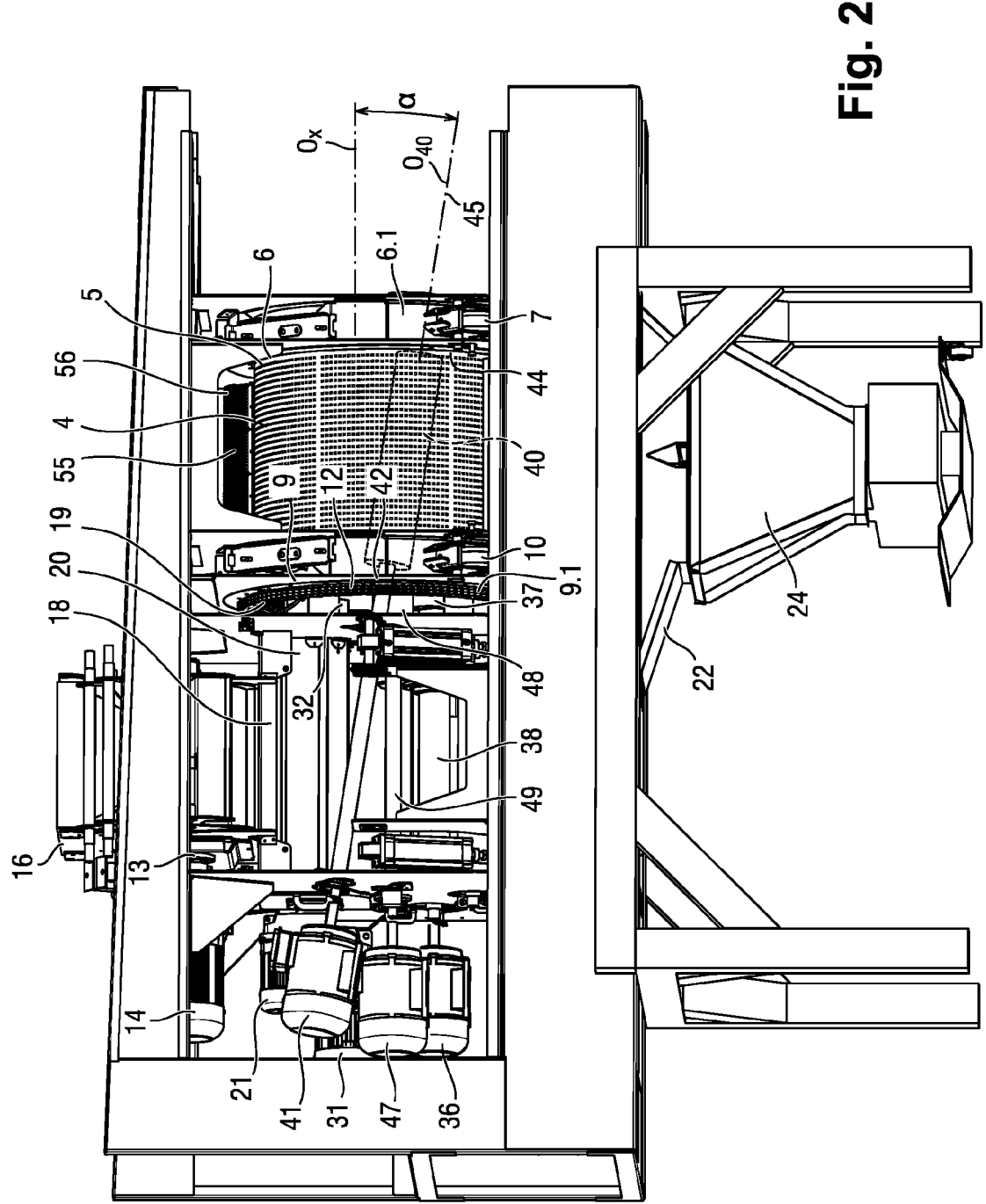
FIG. 2 is a second perspective view of the FIG. 1 processor apparatus.
Figure 3:
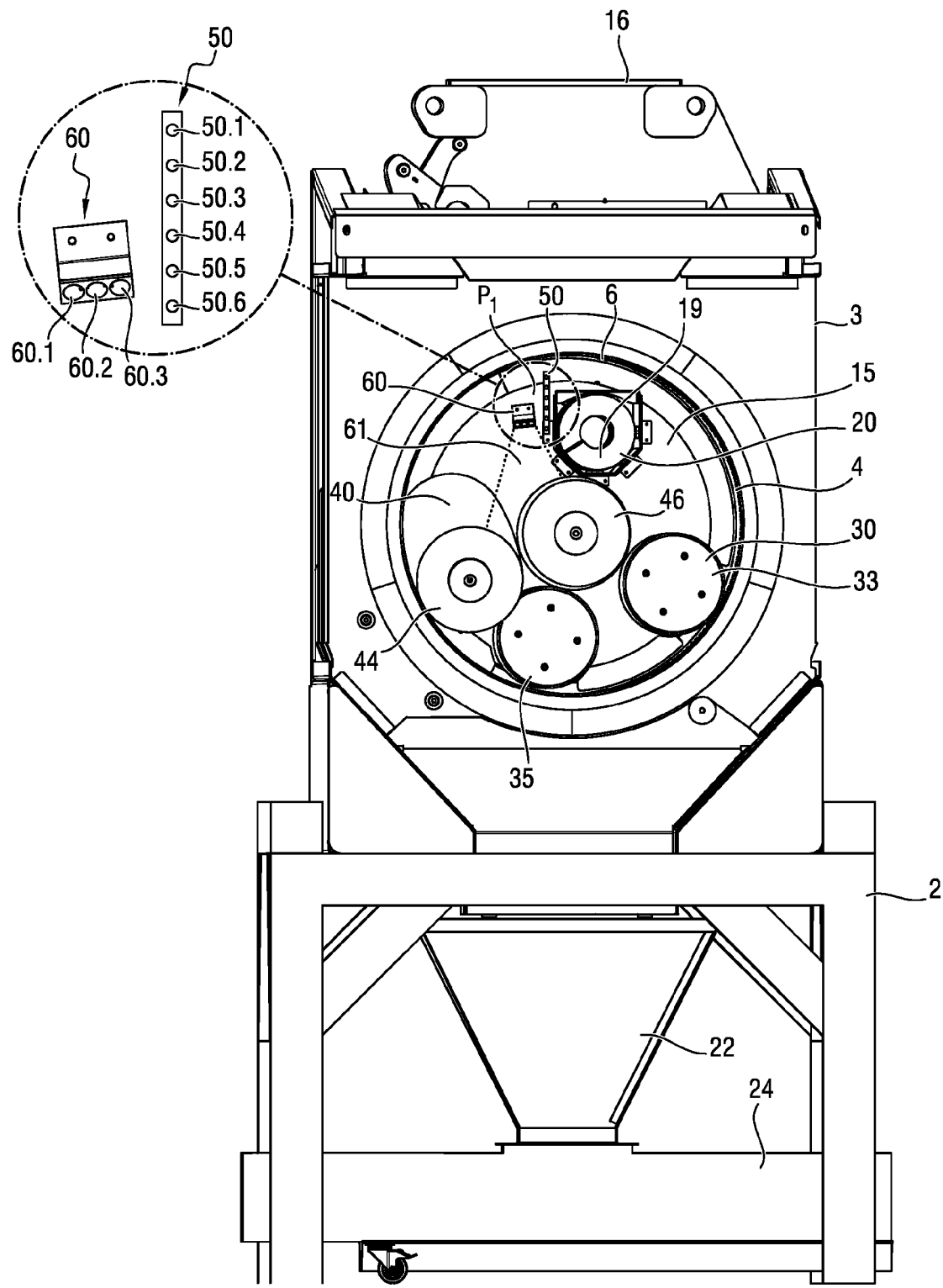
FIG. 3 is an end view of the FIG. 1 processor apparatus.

With reference to FIGS. 1 to 3, the processor apparatus of the invention, given reference 1, includes a frame 2 in the form of a structure made up of machine-welded steel bars and carrying a steel casing 3.

The casing 3 contains a cylindrical drum 4 or trommel in the form of a sheet-metal cylinder perforated by a series of orifices 5 over the great majority of its surface area so as to constitute a screen that is rotatable about a longitudinal first axis Ox. The first end 6 of the drum 4 is open and is supported at its first periphery 6.1 by a first wheel 7 and by a second wheel 8. The second end 9 of the drum 4 is supported at its second periphery 9.1 by a third wheel 10 and by a fourth wheel (not shown). A ring gear 12 is secured to the second periphery 9.1 of the drum 4, and it engages with a spur gear secured to a first output shaft 13 of a first gearmotor 14. A metal sheet 15 closes the second end 9 of the drum 4.

A first feed hopper 16 that is substantially in the shape of an upside-down pyramid has a top opening 17 for loading and a bottom opening discharging into a feed duct 18 of the drum 4. The feed duct 18 has an end constituting a feed port 19 that discharges into the drum 4. An auger 20 driven by a second gearmotor 21 extends inside the feed pipe 23 so as to urge the packages that have been placed in the first hopper 16 and fed thereby into the duct 18 and to move them towards the feed port 19, thereby feeding the drum 4 with packages.

A second hopper 22 for recovering the material adhering to the surfaces of the packages is placed under the drum 4 t to direct the collected material to a container.

A plurality of tools are mounted inside the drum 4.

In this example, the drum 4 contains a first rolling roller 30, a second rolling roller 35, a distributing first brush 40, and a central second brush 46. All of these tools are cantilevered out, i.e. each has only one respective end from which it is suspended.

The first rolling roller 30 is mounted to rotate freely about a second axis O30 that is substantially parallel to the longitudinal first axis Ox. The first roller 30 is generally cylindrical in shape and it is mounted inside of the drum 4 in order to roll on the inside surface of the drum. The first roller 30 has a first outside surface 31 that is smooth and arranged so as to force material to be connected to pass through the drum 4. The first roller 30 is situated in the fourth quadrant of the drum 4 when the drum is observed from its first end 6. The first bearing 32 on which the first rolling roller 30 is mounted is itself mounted at the end of a first actuator so as to be capable of moving along a first radial direction. A first inductive sensor 33 is mounted on the proximal first end 34 of the first roller and measures the rotation of the first roller 30.

The second rolling roller 35 is mounted to rotate freely about a third axis O35 that is substantially parallel to the longitudinal first axis Ox. The second roller 35 is identical to the first roller 30 and is situated in the third quadrant of the drum 4 when the drum is observed from its first end 6. The second bearing 36 on which the second rolling roller 35 is mounted is itself mounted at the end of a second actuator so as to be capable of moving along a second radial direction. A second inductive sensor 37 is mounted on the proximal first end 38 of the second roller 35 and measures the rotation of the second roller 35.

The distributing first brush 40 is driven in rotation about a fourth axis O40 by a third gearmotor 41 connected at the proximal first end 42 of the first brush by a fourth shaft 43. The distal second end 44 of the first brush in this example is situated below the proximal first end 42 in such a manner as to cause the first brush 40 to "plunge" down towards the front. In this configuration, the first brush 40 extends along a first direction 45, specifically parallel to the fourth axis O40, that makes a nonzero angle α with a first plane Ph containing the longitudinal first axis Ox and the proximal first end 42. In other words, the first direction 45 and the longitudinal first axis Ox are not coplanar. The first brush 40 is generally cylindrical in shape and it is mounted inside the drum 4 to brush the inside surface of the drum 4. The speed of rotation of the first brush 40 is preferably much faster than the speed of rotation of the drum 4. The first roller 40 is situated in the third quadrant of the drum 4 when the drum is observed from its first end 6.

The second brush 46 is driven in rotation about a fifth axis O46 coinciding substantially with the longitudinal first axis Ox by a fourth gearmotor 47 connected to the proximal first end 48 of the second brush 46 by a fifth shaft 49 provided with universal joints. The second brush 46 is generally cylindrical in shape.

The drum 4 also contains a blower device 50 for blowing an air stream 51 and an injector device 60 for injecting a water jet 61 into the inside of the drum 4.

The blower device 50 has six blower nozzles 50.1 to 50.6 positioned in a line, specifically along a vertical direction, and located in the proximity of the feed port 19. The blower device 50 is situated in the proximity of the second periphery 9.2 and each of the nozzles 50.1 to 50.6 blows an air stream in a direction that is substantially parallel to the longitudinal first axis Ox.

Thus, the blower device 50 is arranged to blow the air stream 51 coming from the six nozzles 50.1 to 50.6 into a first portion P1 of the drum 4 defined by a that corresponds to the second quadrant of the drum 4 when the drum is observed from its first end 6. The portion P1 corresponds to the first quadrant of the drum 4 when the drum is observed from its second end 9.

As can be seen in FIG. 3, the injector device 60 is located in the proximity of the blower device 50 and in this example it has three spray nozzles 60.1 to 60.3 that are arranged to form a water jet 61 that is projected against the second brush 46 and the first brush 40.

The processor apparatus 1 also includes means for unclogging the orifices 5 during rotation of the drum 4, which means, in this example, are in the form of a wheel 55 mounted to rotate about an axis that extends substantially parallel to the longitudinal first axis Ox, and that has as many toothed disks 56 as the drum has rows of orifices 5.

The first gearmotor 14, the second gearmotor 21, the third gearmotor 41, the fourth gearmotor 47, the controls of the blower device 50 and of the injector device 60, the first sensor 33, the second sensor 37, and other pieces of electrical equipment (for monitoring operation, for safety, etc. . . . ) are all connected to a control unit 57 of the processor apparatus 1.

In operation, a user loads the first hopper 16 with packages 70 through the loading opening 17. Once the first hopper 16 has been loaded, the control unit 57 starts rotation of the drum 4, of the first brush 40, and of the second brush 46. The first and second rollers 32 and 35 are driven in rotation by the rotation of the trommel 4 as a result of the contact pressure that is exerted and adjusted both by the first actuator of the first bearing 30 and also by the second actuator of the second bearing 36. The control unit 57 also starts the blower device 50 and the injector device 60. The control unit 57 then causes the auger 20 to be put into operation until a determined quantity of packages 70 has been inserted into the drum 4—as can be measured by using weight sensors situated on the first hopper 16 or associated with the wheels 7 and 8. In this example, the drum rotates clockwise as shown in FIGS. 1 and 3.

The packages 70 are caught by the first roller 30 so as to be rolled between the outside surface 33 of the first roller 30 and the inside surface of the drum 4. The packages 70 are then rolled a second time by passing between the outside surface of the second roller 35 and the inside surface of the drum 4. Once rolled in this way, the packages are then taken by rotation of the drum 4 towards the first brush 40 in order to be brushed and brought into the zone of contact between the first brush and the inside surface of the drum 4, with the packages being subjected to intense brushing in this zone. This has the effect of removing the materials adhering to the surfaces of the packages 70. Once the packages have left the zone of contact, they are ejected by the first brush 40 into the second quadrant of the drum 4 so as to follow a path that is substantially circular, during which they jump over the first brush 40 and strikes the drum 4 before being caught once more by the first roller 30 and being subjected to the same processing cycle as described above. Each time they jump away from the zone of contact, the packages 70 lose additional material that was adhering to their surfaces, which material is centrifuged during ejection of the packages 70. When the packages 70 pass in front of the nozzles 50.1 to 50.6 of the blower device 50, the lightest packages, i.e. packages having little or no material adhering to their surfaces, are blown out from the drum 4 through the first end 6. The packages 70 that are not clean enough to be ejected drop back either onto the second brush 46, which directs them to the first rolling roller 30 in addition to brushing them, or else directly onto the first rolling roller 30. The pressure of the air stream 51 thus serves to adjust the final level of soiling of the packages 70 that are blown out from the drum 4.

The forward slope of the first brush 40 imparts a longitudinal component to the packages 70 while they are being ejected from the first brush 40. The packages 70 are thus entrained towards the first end 6 of the drum 4 without any need for the drum 4 to be emptied by means of tools or for the drum 4 to slope so as to establish a continuous stream taking waste towards the first end 6 of the drum 4.

By wetting the packages 70, injecting water into the drum 4 by means of the nozzles 60.1 to 60.3 serves to accelerate the collection of material adhering to the packages 70. In combination with the dispersing function of the second brush 46, injecting spray serves to obtain quick and uniform wetting of the packages 70 and of the drum 4 as a whole.

Rotation of the drum 4 causes the wheel 55 to rotate and the teeth of the disks 56 expel plugs of material obstructing the orifices 5, which plugs drop into the drum 4 where the first brush 40, the first roller 30, and the second roller 35 break them up and expel them through the orifices 5.

The dimensions of the orifices 5 in the drum 4 are selected to retain the packages 70, while allowing the materials they contain and that adhere to the packages 70 to pass through. The materials in question are made to pass even more easily by the centrifugal effect of the drum 4 rotating, with these materials then being found in the frame 2, while the packages 70 are retained inside the drum 4 until they are expelled via the first end 6. The materials detached from the packages are collected by means of scrapers and they are directed to the second hopper 22 in order to be received by the container 24.

Processor apparatus for collecting material adhering to the surfaces of packages is thus obtained that consumes little water and that quickly expels clean packages without them being subjected to pointless additional rolling/brushing cycles. This reduces the time and the quantity of energy and water devoted to cleaning a given volume of packages for processing.

The control unit 57 analyzes the information coming from the first sensor 33 and from the second sensor 37, and it determines a first difference 530-4 between the first speed of rotation V30 of the first roller 30 and the speed of rotation of the trommel 4. The control unit 57 also determines a second difference 535-4 between the second speed of rotation V35 of the second roller 35 and the speed of rotation of the trommel 4. By making use of the fixed ratios that exist between the inside radius of the trommel 4 and the outside radii of the first roller and of the second roller 35, the unit 57 determines first slip between the first roller 30 and the trommel 4 and second slip between the second roller 35 and the trommel 4. When the first slip and/or the second slip exceeds a predefined threshold, the control unit triggers a warning recommending that a cleaning operation be performed on the first roller 30 and/or the second roller 35. Alternatively, the control unit 57 may trigger the cleaning operation automatically.

During an operation of cleaning the processor apparatus 1, the control unit 57 controls the first and second actuators in such a manner that the first and second rollers 30 and 35 move radially and come into contact with the second brush 46. The control unit 57 then causes the second brush 46, the first roller 30, and the second roller 35 to rotate and starts the water ejector device 60. The second brush then cleans the rollers while the first brush 40 cleans the inside surface of the drum 4.

The first and second actuators can also be used to adjust the distances separating the first and second rolling rollers 30 and 35 from the inside surface of the drum 4 in order to match the type of packages 70 for processing.

Naturally, the invention is not limited to the embodiment described, but covers any variant coming within the ambit of the invention as defined by the claims.

In particular;
   although, above, the waste is compressed by a cylindrical roller that is rotatably mounted, the invention applies equally well to other compression means, e.g. such as a stationary cylindrical roller, a stationary plane scraper positioned to form an acute angle with the inside surface of the drum, or a stationary metal sheet of cross-section that is substantially comma-shaped. Such a scraper or such a sheet could present a portion provided with claws (for a first function of unpackaging) and a second portion for guidance (rolling). More generally, the compression means serve to guide the waste into a space that diminishes progressively as the waste approaches the inside surface of the drum. The compression means of the invention may equally well comprise a compression cone having its axis of rotation optionally parallel to the axis of rotation of the drum, or they may comprise a cylinder of octagonal or any section.

Although, above the unclogging means comprise a toothed wheel, the invention applies equally to other means for unclogging the drum while it is rotating, e.g. such as high-pressure injection of water, of air, or of shot striking the drum;

although, above, the second rolling roller is provided with its own motor, the invention applies equally to a second roller driven by the same motor as the first roller, e.g. by means of a belt or chain coupling;

although, above, the processor apparatus has two identical rolling rollers, the invention applies equally to apparatus having only one roller, or a plurality of rollers, which could be different;

although, above, the processor apparatus has a blower device for blowing air, the invention applies equally to other types of device for blowing a gas stream, e.g. such as blowing nitrogen or any other gas or gas mixture;

although, above, the processor apparatus includes a water spray device, the invention applies equally two other types of injector device, e.g. such as a flow at low or zero pressure, a jet instead of a spray, or rain. The injected liquid may be based on water or it may be based on some other substance and contain additives of decreasing, bactericidal, cleaning, or solvent type;

although, above, the apparatus is described as having two brushes, to rolling rollers, a water injector device, and an air blower device, the invention applies equally to other apparatus configurations that, depending on the diameter desired for the drum or other constraints concerning the type of packages being processed, could have only one brush and a blower device, or more than two brushes and/or only one roller or more than two rollers;

although, above, the direction of the gas stream is substantially parallel to the longitudinal axis, the invention applies equally to any other gas stream having a component substantially parallel to the longitudinal axis for directing lightweight packages at the end of the cycle (i.e.: towards the open end of the drum);

although, above, the drum has an open end and the packages that has been subjected to a complete processing cycle (i.e. to one or more brushing cycles depending on the degree of signing), the invention applies equally to a drum that is closed and in which the packages that have been processed accumulate at one end;

although, above, the blower device is positioned in a portion that corresponds to the second quadrant of the drum when the drum is observed from its first end 6, the invention applies equally to other locations for the blower device within the drum, and preferably to a location in a portion that corresponds to the first quadrant of the drum when the drum is observed from its first end;

although, above, the relative location of the first brush and of the first rolling roller enables the first brush to direct packages towards the first rolling roller, the invention applies equally to other means for directing the packages leaving the first brush towards the first rolling roller, e.g. such as by adjusting the diameter and/or the speed of rotation of the first so as to direct the packages towards the first rolling roller; and although, above, the inductive sensors are located on the rolling rollers, the invention applies equally to other types of rotation sensor, e.g. such as an optical encoder, a point encoder, or an alternator.

The invention claimed is:

1. Processor apparatus for collecting material adhering to surfaces of packages for processing as waste, the processor apparatus comprising a cylindrical drum that is rotatable about a longitudinal first axis and that is provided with orifices for forming a screen that retains the packages and that allows the material for collecting to pass through;
   a motor (14) for driving the cylindrical drum in rotation; and
   a first brush for brushing an inside surface of the cylindrical drum;
   the apparatus being characterized in that it includes a blower device inside the drum for blowing a gas stream in a direction having a component parallel to the longitudinal first axis.

2. The processor apparatus according to claim 1, comprising a first rolling roller for rolling the packages.

3. The processor apparatus according to claim 2, wherein the first brush is arranged to direct the packages towards the first rolling roller.

4. The processor apparatus according to claim 1, wherein the blower device has six blower nozzles.

5. The processor apparatus according to claim 1, wherein the blower device is arranged to blow the gas stream into the first quadrant or the second quadrant of the drum.

6. The processor apparatus according to claim 1, comprising a second brush.

7. The processor apparatus according to claim 1, comprising an ejector device for injecting a liquid jet.

8. The processor apparatus according to claim 6, wherein the injector device is arranged to inject the liquid jet at least onto the second brush.

9. The processor apparatus according to claim 2, wherein the first rolling roller is mounted to be movable relative to the frame in order to adopt a working first position in which the first rolling roller is not in contact with the second brush and a maintenance second position in which the first rolling roller comes into contact with the second brush.

10. The processor apparatus according to claim 6, wherein the second brush extends substantially along the longitudinal first axis.

11. The processor apparatus according to claim 2, comprising a second rolling roller.

12. The processor apparatus according to claim 6, wherein the second rolling roller is mounted to be movable relative to the frame in order to adopt a working first position in which the second rolling roller is not in contact with the second brush and a maintenance second position in which the second rolling roller comes into contact with the second brush.

13. The processor apparatus according to claim 1, wherein the first branch has a proximal first end and a distal second end, and the first brush extends in a first direction that forms a nonzero angle with a plane containing the longitudinal first axis and the distal second end or the proximal first end.

* * * * *